July 13, 1937.　　　P. B. STREANDER　　　2,086,829
COMBINED SETTLING AND FILTRATION
Filed March 21, 1935　　　6 Sheets-Sheet 4
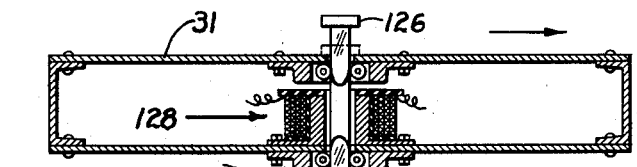
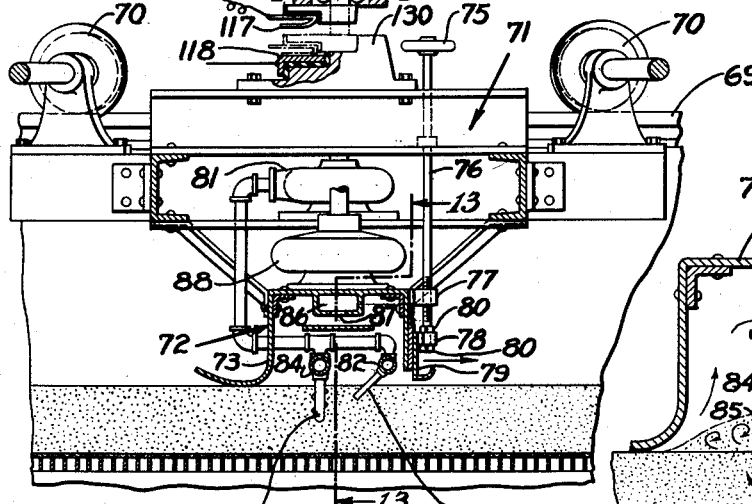
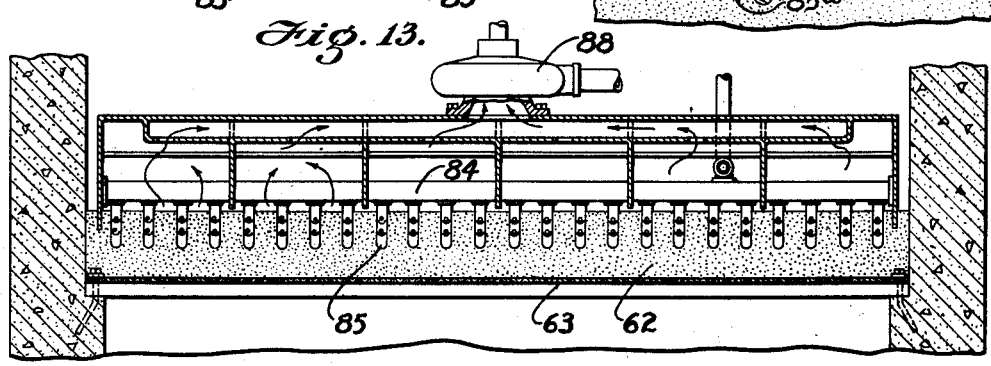
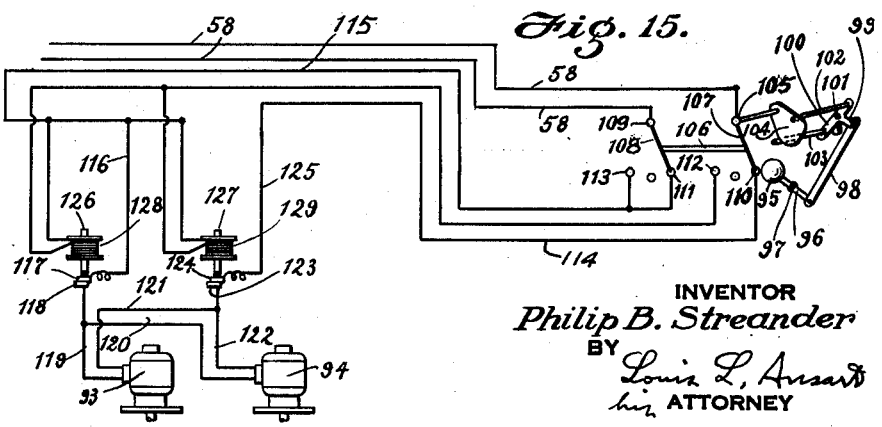
INVENTOR
*Philip B. Streander*
BY
*Louis L. Ansart*
his ATTORNEY

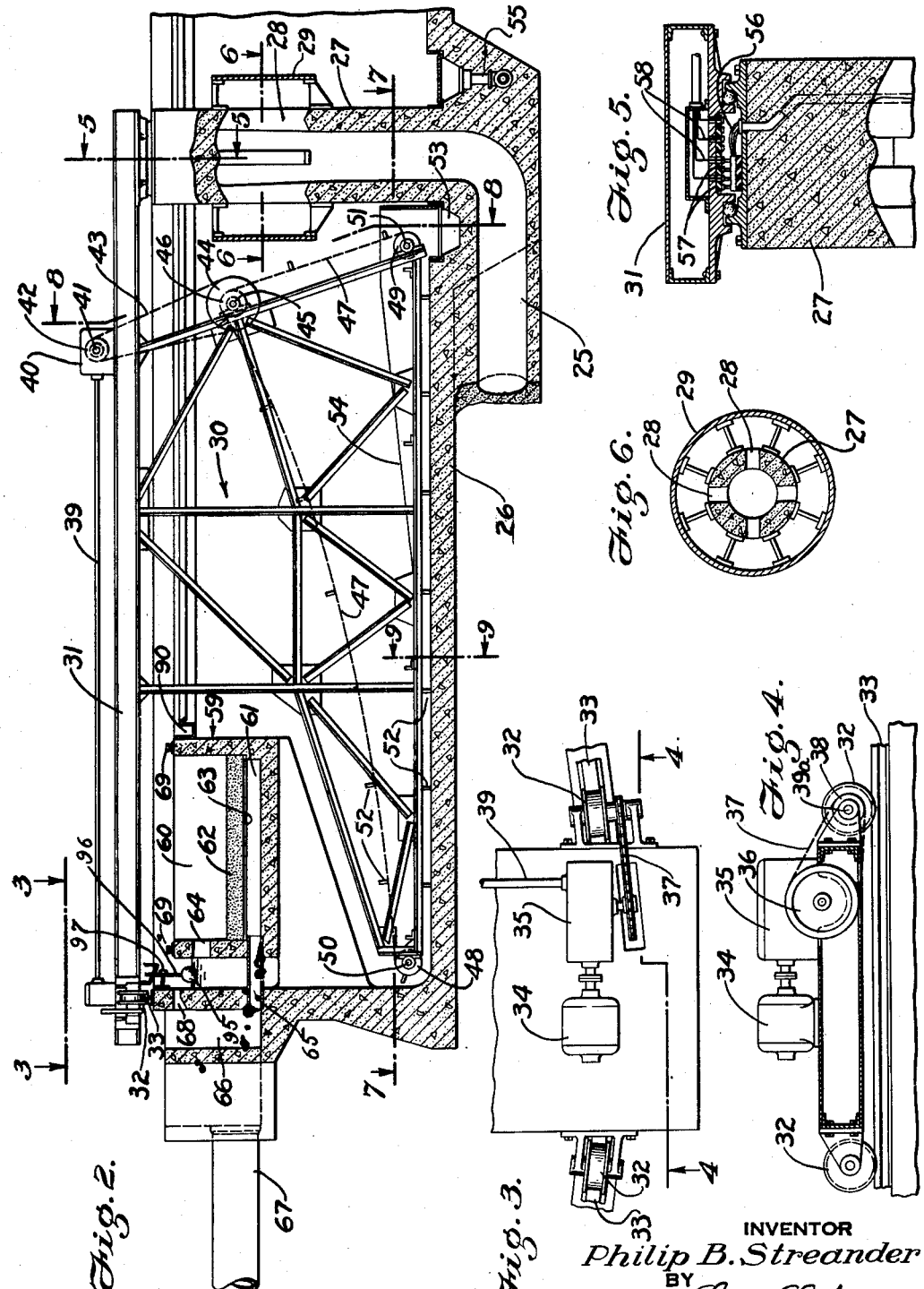

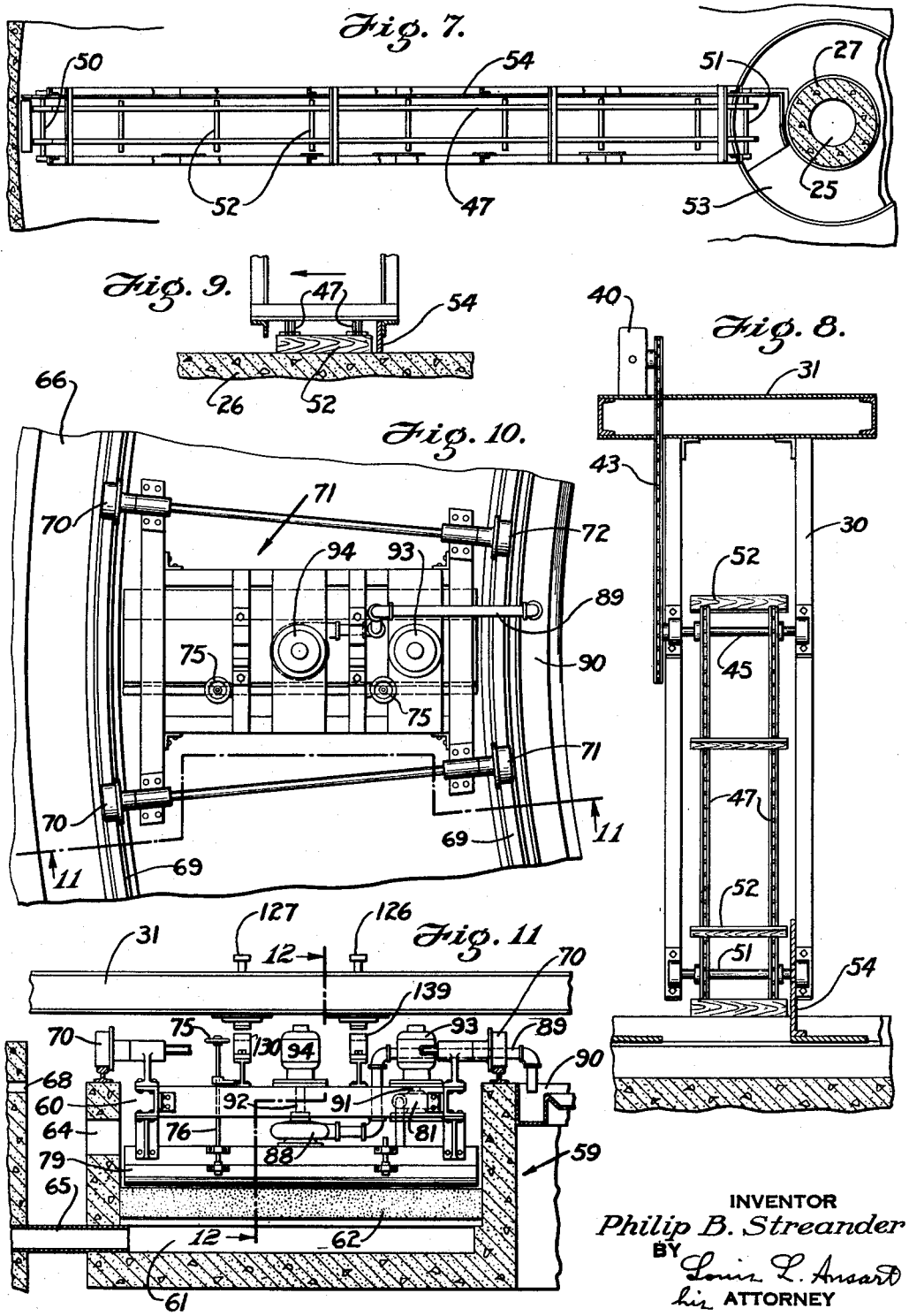

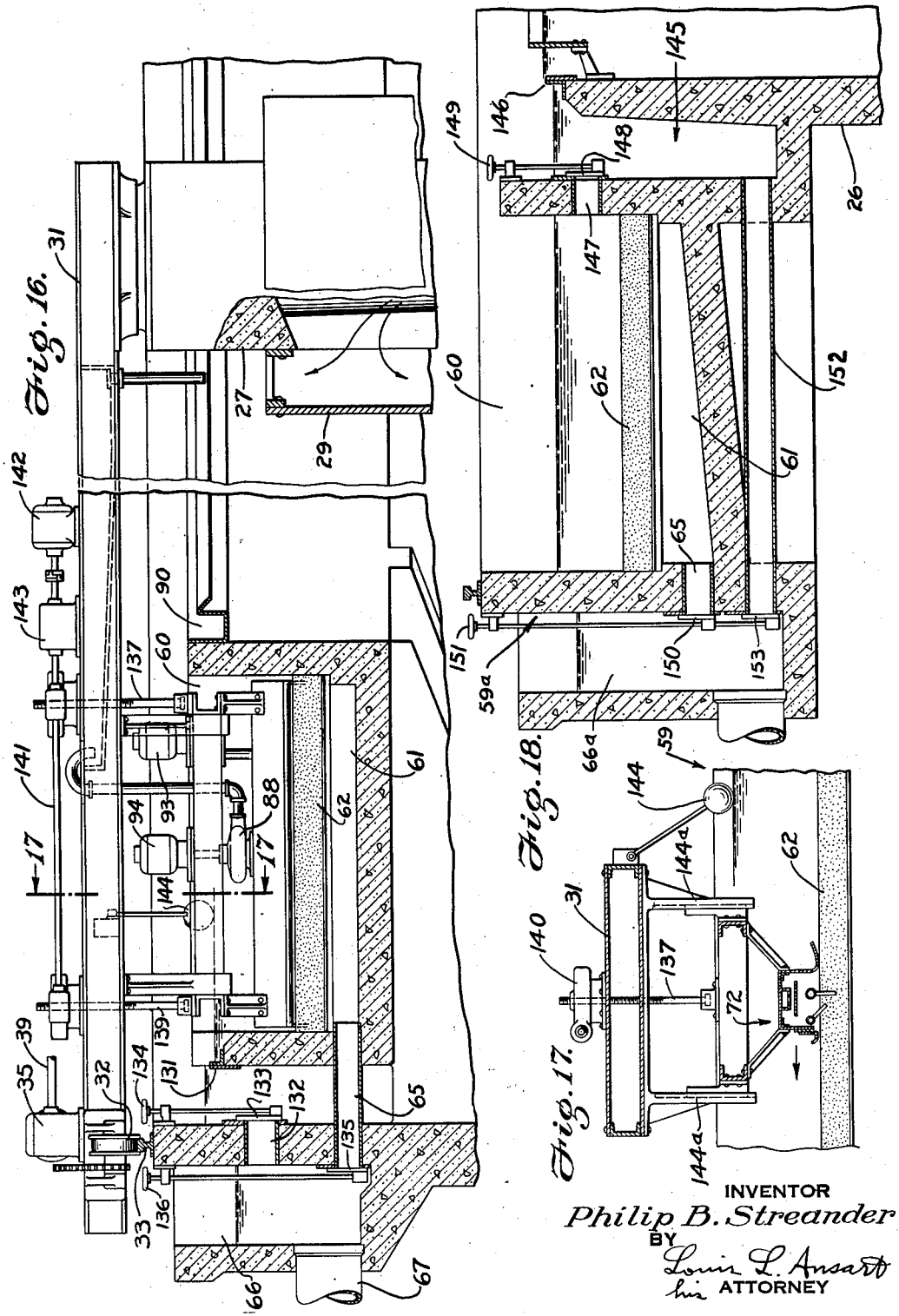

July 13, 1937.  P. B. STREANDER  2,086,829
COMBINED SETTLING AND FILTRATION
Filed March 21, 1935   6 Sheets-Sheet 6

INVENTOR
Philip B. Streander
BY
Louis L. Ansart
his ATTORNEY

Patented July 13, 1937

2,086,829

UNITED STATES PATENT OFFICE 2,086,829

COMBINED SETTLING AND FILTRATION

Philip B. Streander, Scarsdale, N. Y., assignor, by mesne assignments, to Underpinning & Foundation Company, Inc., New York, N. Y., a corporation of New York Application March 21, 1935, Serial No. 12,271

13 Claims. (Cl. 210—5)

This invention relates to the treatment of sewage and the like and important objects relate to the provision of novel and advantageous methods and means for the rapid removal of suspended solids from sewage.

In carrying out the invention use may be made of a combined settling and filtering unit or tank whereby the sludge removal is effected mechanically and from 50 to 60 per cent of the suspended solids are removed in a period which is decidedly short compared with the long period of settling which would otherwise be required. Such removal of suspended solids may be effected without the use of chemicals or other extraneous substances. Furthermore sedimentation may be carried on jointly or the removal of solids may be effected by sedimentation only.

The combined settling and filtration unit may include a plain settling tank in which the sewage is introduced at the center and flows outwardly toward the periphery. The effluent discharge is distributed around the periphery of the tank to enable a low velocity of discharge and a minimum disturbance in the settling tank. The discharged effluent flows into a chamber or flume preferably extending around the settling compartment or tank. Sewage in this flume may be discharged directly from this flume or when additional removal of solids is required the sewage from the flume may be discharged from the flume to a filter preferably extending around the settling tank and comprising a bed of a suitable depth of sand, or other approved filtering material on supporting means including a suitable screen. The filter bed is mounted in a channel so as to divide the same into an upper chamber to receive the liquid to be filtered and a lower chamber to receive the filtrate. The arrangement is such that the filter may be cut out of service when filtration is not required and also when repairs are to be made. Without this provision, any substantial renewal or repair work on the filter would necessitate the withdrawal of the settling tank from service, as well as the filter.

Provision may also be made of a suitable traveling cleaner arranged over the filter compartment by means of which the finer suspended solids may be continuously or intermittently removed. The cleaner may be mounted to travel on rails at opposite sides of the filter bed and when the liquid over the bed rises to a predetermined level suitable devices are shifted, as by float control, so that the cleaner is picked up by a rotary bridge, extending from the center to the periphery of the settling tank, and thrown into operation. By this cleaning operation the level of the liquid over the filter is caused to fall and, when it drops to or below said predetermined level, the cleaner is stopped and is disconnected from the bridge. If intended for continuous use, the cleaner may be rigidly mounted on and suspended from the bridge. Preferably, however, the mounting of the cleaner on the bridge is such that the cleaner may be raised or lowered as required for intermittent use. The washing is, in all cases, controlled entirely in accordance with the maximum loss of head at which it is desired to operate the filter. When the loss of head reaches the predetermined maximum, the cleaner or washer mechanism is lowered to the surface of the sand or filtering media and the bed of this material is cleaned. As soon as such cleaning is completed the washer is raised to the level of the sand and the washing action ceases.

Other objects, features and advantages will appear upon consideration of the following description and of the drawings, in which Fig. 1 is a top plan view of a combined settling and filtration tank embodying the present invention;

Fig. 2 is a section taken on the line 2—2 of Fig. 1;

Fig. 3 is a fragmentary plan view taken as indicated by line 3—3 on Fig. 2;

Fig. 4 is a section taken on the line 4—4 of Fig. 3;

Fig. 5 is a section taken on the line 5—5 of Fig. 2;

Fig. 6 is a section taken on the line 6—6 of Fig. 2;

Fig. 7 is a section taken on the line 7—7 of Fig. 2;

Fig. 8 is a section taken on the line 8—8 of Fig. 2;

Fig. 9 is a section taken on the line 9—9 of Fig. 2;

Fig. 10 is a fragmentary plan view showing on a larger scale the cleaner shown in Fig. 1;

Fig. 11 is a section taken on the line 11—11 of Fig. 10;

Fig. 12 is a section taken on the line 12—12 of Fig. 11;

Fig. 13 is a view taken on the line 13—13 of Fig. 12;

Fig. 14 is a section of the cleaner taken in a vertical plane perpendicular to the section plane of Fig. 13;

Fig. 15 is a diagrammatic view of an electrical system for controlling the action of the cleaner;

Fig. 16 is a view similar to Fig. 2 showing a modification in which the cleaner is suspended from the bridge and is automatically raised and lowered and the supernatant liquid is either fed to the filter or by-passed in a different manner;

Fig. 17 is a section taken along the line 17—17 of Fig. 16;

Fig. 18 is a section showing a modification in which the filter is outside the settling tank;

Figure 1:
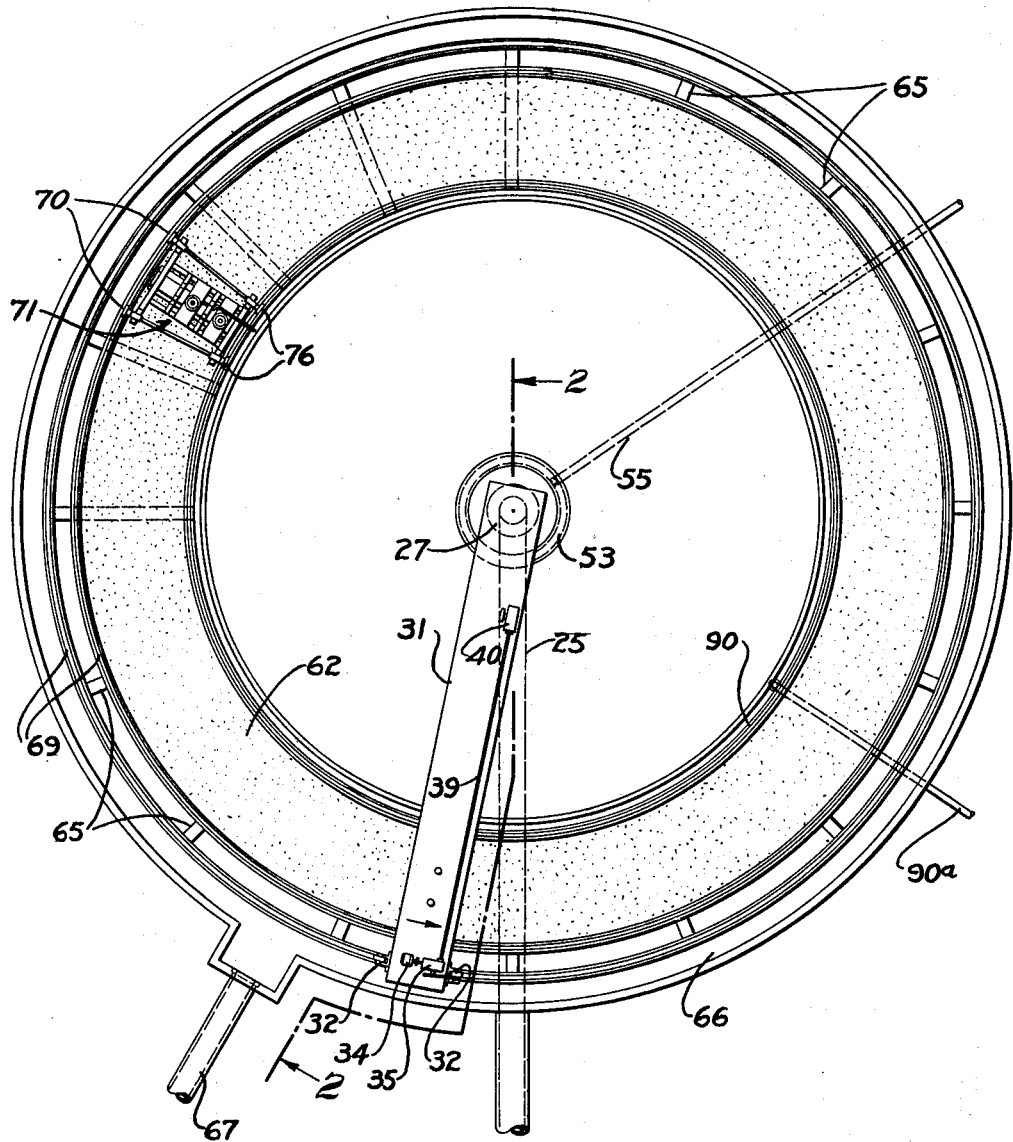

Referring to Figs. 1 to 15 of the drawings, screened raw sewage flowing through a conduit 25 is introduced to the settling compartment of the settling tank 26 through a hollow support or pier 27 and outlets 28 in the sides of the pier 27, undue disturbance of the sewage in the tank being avoided by suitable means such as a cylindrical diversion and distributing baffle 29 surrounding said pier at the level of said outlets and spaced from the pier so that the sewage may be discharged above and below the baffle. The sewage entering the tank flows outwardly at a relatively low velocity which permits the heavier suspended solids to be settled out and deposited at the bottom of the tank. At the bottom of the tank the sludge formed of such deposited solids is concentrated at the center of the tank by suitable scraper mechanism carried by frame 30 suspended from a bridge 31 mounted on the pier 27 so as to turn about its vertical axis and supported at its outer end by means of wheels 32 carried thereby and running on a rail 33 on the top of the peripheral wall of the tank 26.

The bridge 31 may be turned about the axis of the pier 29 by suitable means such as an electric motor 34 (Figs. 1, 3 and 4) driving suitable gearing in a gear box 35 to rotate a sprocket wheel 36 and through a sprocket chain 37 drive a sprocket wheel 38 mounted on a shaft 39a on which one of the wheels 32 is rigidly mounted, thereby causing the bridge to rotate slowly about the axis of the pier. The gearing in the gear box also serves to drive a shaft 39 extending inwardly along the bridge to a gear box 40 containing gearing adapted to rotate a shaft 41 carrying a sprocket wheel 42. Through a sprocket chain 43 the sprocket wheel 42 rotates a sprocket wheel 44 mounted on a shaft 45 journalled on the frame 30. Driving sprocket wheels 46 on the shaft 45 drive sprocket chains 47 passing around idler sprockets 48 and 49 rotatably mounted on the frame 30 by means of shafts 50 and 51, so that scrapers 52 carried by the sprocket chains 47 will move along the floor of the tank 26 (between the sprockets 48 and 49) and carry the sludge toward the center of the tank where it will be deposited in an annular channel or sump 53 surrounding the lower end of the pier 27, the sludge being maintained in the path of the scrapers 52 by means of a scraper or plough 54 at the rearward side of the scrapers 52 as they move toward the center of the tank. From the annular channel 53 the sludge may be withdrawn through a suitable pipe or line 55 and carried to any desired location.

Electric power may be supplied on the bridge from power lines 56 brought up through the pier 27 and connected by the use of slip rings 57 with suitable conductors 58. Electric power for the motor 34 and other electrical apparatus may be supplied in this way.

Inside the tank 26 and spaced from the peripheral wall thereof is an annular flume or channel 59 divided into upper and lower chambers 60 and 61 by means of a filter bed 62 which may effect the removal of the smaller and less readily settled solids and may be made up of suitable material such as sand or "anthrafilt" supported on a suitable screen 63. It should be understood the "anthrafilt" consists of graded anthracite coal. The supernatant liquid in the upper part of the tank passes upwardly between the flume 59 and the peripheral wall of the tank and into the upper compartment of the flume 59 through openings 64 in the outer wall thereof. After passing downwardly through the filter into the lower compartment of the flume, the filtered sewage passes through one or more conduits or pipes 65 into an effluent channel or launder 66 from which it may be discharged through a pipe 67. The inner wall of the launder 66 may be provided with one or more openings 68 through which the supernatant liquid may pass into the effluent launder 66 when the filter becomes so clogged as to be unable to take care of the sewage supplied thereto and the liquid rises to an excessive height in the flume 59.

Mounted on the opposite walls of the annular flume 59 are rails 69 on which run wheels 70 supporting a cleaner 71 which comprises a chamber or box 72 normally submerged in the liquid above the filter and having an open lower side with a rear wall 73 extending downwardly to the proper level for the top of the filter bed 62 and suitably curved to pass smoothly over the bed and with an adjustable front wall 74 slightly raised above the normal surface of the filter bed so as not to disturb the layer of sewage solids there accumulated. Such adjustment of the movable front wall may be effected by means of hand wheels 75 at the upper end of rods 76 screw threaded through lugs 77 fixed to the box 72, the lower end of each rod 76 passing loosely through a lug 78 fixed on the movable lower part 79 of said wall 74 and held against movement therethrough by collars 80. Said part 79 having its lower edge shaped to ride readily over the filter medium and sewage solids thereon.

The cleaner is also provided with a pressure pump 81 to force liquid, such as that above the filter bed into a front manifold 82 provided with downwardly and rearwardly extending nipples or jet tubes 83 having open ends to discharge the water into the filter medium through which the nipples are drawn, and into a rear manifold 84 having downwardly extending tubes or nipples 85 adapted to rake through the filter medium and provided with upwardly and outwardly directed openings or jets 85a. As illustrated in Fig. 14, the stirring up of the filter medium by the nipples 83 and 85 and the water forced through said nipples serves to clean the filter medium and cause the dirty or waste water to pass upwardly into the box 72 above the filter medium.

At the top of the box or caisson 72 is a conduit 86 provided at its lower side with openings 87 through which the dirty water may be drawn by suction pump 88 connected with the conduit 86 and discharging through a pipe 89 into scum trough 90 at the inner side of the flume 59. The scum trough may be drained through a pipe 90a (Fig. 1). The pumps 81 and 88 are rotary pumps and their driving shafts 91 and 92 are driven by electric motors 93 and 94 in axial alignment therewith.

As illustrated, cleaner 71 does not travel continuously with the bridge 31 but is picked up thereby when, due to clogging of the filter by accumulation of sewage solids, the rate of flow through the filter bed is so reduced that the level of liquid in the tank 26 and flume 59 rises above a predetermined level and lifts accordingly a ball float 95 at the end of a lever 96 mounted to swing about a pivot 97 projecting inwardly from the wall carrying the rail 33. At its other end the lever 96 is pivoted to one end of a link 98 which is pivoted at its other end to an arm 99 projecting from the middle of a lever 100 having a central pivot 101. The lever 100 is connected at one end with a longitudinally guided pin 102 and at the other end with a longitudinally guided pin 103 whereby upward movement of the float 95 will advance the pin 103 and retract the pin 102 and downward movement of the float 95 will advance the pin 102 and retract the pin 103 thus placing one or the other of the pins 102 and 103 in position to control the position of a generally triangular member 104 mounted at its apex on a shaft 105 carried by the bridge 31.

As shown in Fig. 15 the bridge has substantially completed a complete revolution after the member 104 has been swung to its indicated position by the pin 103 projected into its path by movement of the float 95 upwardly to a predetermined position. If the pin 102 be still in retracted position the member 104 will remain in the same position for another revolution, but if at this time the pin 102 be in advanced position and the pin 103 in retracted position the pin 102 will engage the member 104 and turn it in the opposite direction. Such movement of the shaft 105 will cause the double-switch arms 107 and 108 connected by a link 106 to turn respectively about the axis of shaft 105 and a pivot 109 respectively to engage contacts 110 and 111 or contacts 112 and 113.

At their pivotal connections the arms 107 and 108 are electrically connected to two of the power lines 58 and, when in their Fig. 15 positions corresponding to a raised position of the float 95, furnish current to two conductors 114 and 115 respectively. From the conductor 114 current is supplied through a branch 116, contacts 117 and 118 to a branch 119 leading to the electric motor 93 and a branch 120 leading to the motor 94. Current passes from these motors through branches 121 and 122 to a contact 123 and therefrom through a contact 124 and a branch 125 to the line 115. The contacts 118 and 123 are fixed on the cleaner, as indicated for contact 118 on Fig. 12, and the contacts 117 and 124 are carried by the cores 126 and 127 of the solenoids 128 and 129 mounted on the bridge 31, as indicated for contact 117 on Fig. 12.

With the double switch set as indicated in Fig. 15 the solenoids 128 and 129 are deenergized and the cores 126 and 127 are in lowered positions thus effecting engagement between contacts 117 and 118 and between contacts 124 and 123. The lower ends of the cores also engage upward projections 130 (Fig. 12) on the cleaner 71 so as to carry the cleaner around the tank. When at the end of a subsequent revolution of the bridge the pin 102 is advanced by sinking of the float 95, the double switch will be shifted so that the arms 107 and 108 will engage the contacts 112 and 113 thus energizing the solenoids 128 and 129 and raising the cores 126 and 127 to release the cleaner from the bridge.

It should be understood that the foregoing description and the drawings described therein are used for purposes of illustration and that my invention is not to be limited in scope to any such detailed disclosure.

The arrangement whereby the cleaner is to be carried through complete turns is of great importance in that it assures uniform cleaning all around the annular flume and uniform filtration due to substantially uniform condition of the filter bed throughout its length.

In Fig. 16 there is shown a modified form of apparatus in which the supernatant liquid enters the flume 59 by overflowing a wall or weir 131 and the wall carrying the rail 33 is provided with one or more passages 132 at a level below the level of the upper edge of the overflow wall 131 and above the pipes 65 so that by opening a gate 133, at the inner ends of such openings or pipes 132, by means of a handle 134 the liquid at the outer side of the flume may flow outwardly into the launder 66 and by-pass the filter bed 62. Under such conditions the discharge ends of the pipes 65 are preferably closed at their discharge ends by gates 135 controlled by handles 136.

Also in this embodiment of the invention the cleaner 71 is suspended from the bridge 31 by means of rods 137 having screw threaded upper ends fitting into nuts (not shown) enclosed in casings 140, such nuts being formed at their peripheries as worm gears and being rotated by corresponding worms (not shown) on a shaft 141 driven by a motor 142 through a speed changer 143, both of which devices are mounted on the bridge 31. The action of the motor 142 may be controlled as to starting, stopping and reversing by means of a float 144 (Fig. 17), and the motors 94 and 93 may be started (in that order) by depression of the cleaner in the guider 144a (Fig. 17), and stopped in the reverse order by upward movement of the cleaner.

According to another modification (Fig. 18) a flume 59a is mounted outside of the tank 26 being separated therefrom by a channel 145 into which the supernatant liquid is discharged over an overflow wall 146. Liquid may be supplied from the channel 145 to the chamber 60 above the filter bed 62 through openings 147 in the inner wall of the flume and provided with gates 148 to be opened and closed by means of handles 149. The liquid passing downwardly through the filter bed 62 into the chamber 61 may be discharged through a pipe 65 into a launder 66a, the pipe 65 being provided at its discharge end with a gate 150 controlled by means including a handle 151. At the lower end of the channel 145 connection is made by one or more pipes 152 with the lower part of the launder 66a, each pipe 152 being provided at its discharge end with a gate 153 and by suitable connections it may be so arranged that handle 151 may control both sets of gates 150 and 153 so that one set will be open when the other is closed and vice versa. When the gates 150 are closed the gates 148 may also be closed.

Figure 19:
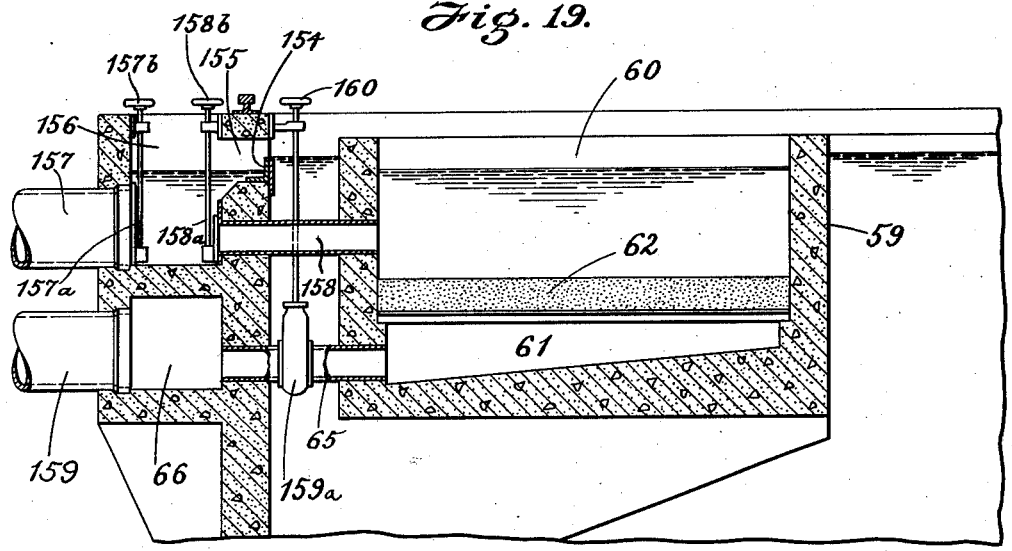
Fig. 19 is a similar section showing a second modification in which the filter is inside the tank.

In Fig. 19 there is shown a modified arrangement in which the flume 59 is within the tank but does not receive the supernatant liquid directly therefrom, said liquid overflowing weirs 154 in openings 155 near the top of the peripheral wall and passing into a launder 156 from which the liquid may be discharged through a pipe 157, or pipe 157 may be closed in any suitable manner and the liquid passed through pipes 158 into the upper chamber 60 of the flume 59 so that it will pass downwardly through the filter 62 into chamber 61 and therefrom through pipes 65 to a peripheral duct 66 connected with a discharge pipe 159. The pipe 65 may be provided with a valve 159a controlled by a handle 160. The closing of the pipe 157 may be effected by a gate 157a controlled by means of a handle 157b.

Figure 20:
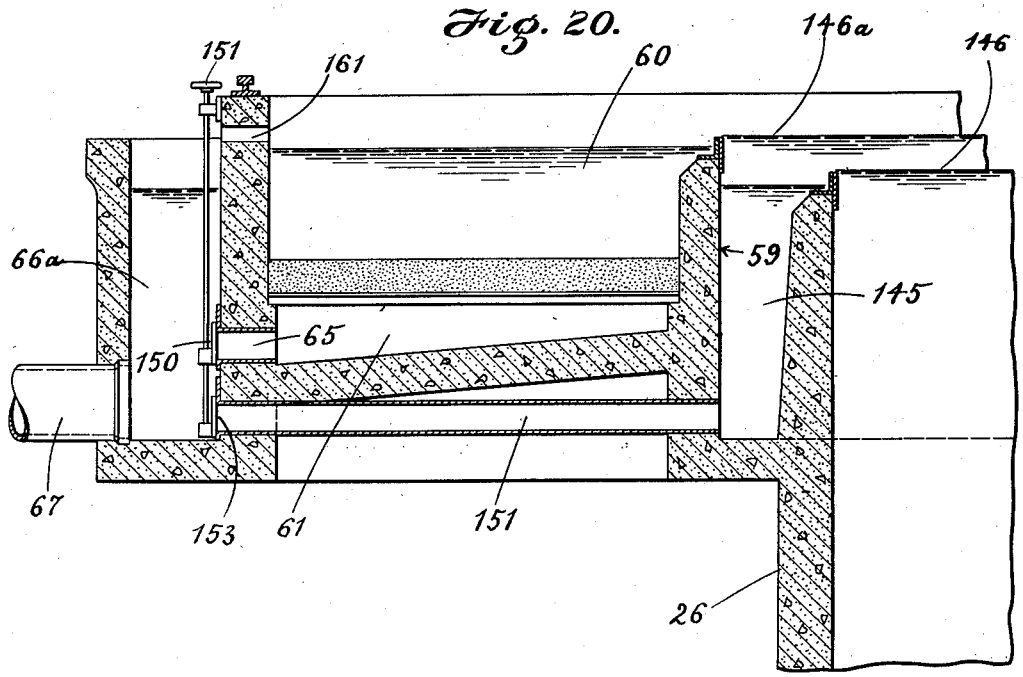
Fig. 20 is a similar section showing a third modification in which the filter is outside the tank.

According to the modification illustrated in Fig. 20, a flume 59 is placed outside the tank and separated therefrom by a channel 145 receiving the supernatant liquid over an overflow weir 146 at the top of the peripheral wall of the tank. Beneath the flume 59 the channel 145 is provided with pipes 151 connected with the lower part of the launder 66a at the outer side of the flume and adapted to discharge through a pipe 67. The chamber 61 of the flume discharges through short pipes 65 into the launder 66a. The pipes 65 and 151 may be closed by gates 150 and 153 respectively controlled through a handle 151 so that when either of the gates 150 and 153 is closed the other will be open. When the gate 153 is closed the level of the liquid in the tank 26 and channel 145 will rise until it overflows an overflow edge 146a at the top of the inner wall of the flume 59, thus supplying supernatant liquid to the upper chamber 60 of the flume. The outer wall of the flume may be provided with suitable openings 161 to prevent the level of liquid in the flume from rising too high.

The various arrangements shown in Figs. 16, 18, 19 and 20 enable the supernatant liquid to be disposed of in different ways so that different parts may be thrown out of use when desired.

It will be evident that the electrical system of Fig. 15 is merely illustrative and that many changes may be made therein, for example by the use of timed relays. Preferably the pressure pump should be started slightly in advance of the suction or waste-water-removal pump and in stopping the pumps the suction pump should be stopped first.

It should be understood that various changes may be made and that various features may be used without others without departing from the true scope and spirit of the invention.

Having thus described my invention, I claim:

1. The combination with a settling tank, a central pier and a bridge supported on the pier and the peripheral wall of the tank and revolving about its support on the pier, of an endless flume adjacent to said peripheral wall and receiving supernatant liquid from the tank, a filter bed in said flume, an overhead filter-bed cleaner mounted to travel along said flume, means for connecting said cleaner to said bridge to be drawn thereby along said flume and clean the filter bed therein, and means controlled by the liquid level in the flume for rendering such connecting means effective when the liquid rises to a predetermined level in said flume and ineffective when the liquid in said flume falls to a predetermined level.

2. The combination with a settling tank, a central pier, a bridge supported on the pier and the peripheral wall of the tank and revolving about its support on the pier, an endless flume adjacent to said peripheral wall and receiving supernatant liquid from the tank, a filter bed in said flume, of an overhead filter-bed cleaner mounted to travel along said flume, cooperating coupling devices on said bridge and cleaner and controlling means for said coupling devices including a settable device on the bridge and a settable device at a predetermined point along the flume, one of said settable devices being effective in one position to cause the coupling devices to cooperate and in another position to prevent cooperation thereof, and the other of said settable devices controlled by the liquid level in the channel and acting on the first, when the liquid in the channel rises to a predetermined level in the channel, to render the coupling devices effective and when the liquid in the channel falls to a predetermined level, to render the coupling devices ineffective.

3. The combination with a settling tank, a central pier and a bridge supported on the pier and the peripheral wall of the tank and revolving about its support on the pier, of an endless flume adjacent to said peripheral wall, a passage between said peripheral wall and the flume to receive liquid from the tank and supply it at the same level to said flume, a filter bed in said flume, an overhead filter-bed cleaner mounted to travel on said flume, a float supported by the liquid in said passage, and means controlled by the float to connect the cleaner to the bridge at a predetermined position of the latter when the liquid level rises to a predetermined level and to disconnect the cleaner from the bridge at said predetermined position when the liquid sinks to a predetermined level.

4. The combination with a settling tank, a central pier and a bridge supported on the pier and the peripheral wall of the tank and revolving about its support on the pier, of an endless flume adjacent to said peripheral wall and receiving supernatant liquid from the tank, a filter bed in said flume, an overhead filter-bed cleaner mounted to travel along said flume, said cleaner including a pressure pump and a waste-water-removal pump, and means for connecting said cleaner to said bridge to be drawn thereby along said flume and concomitantly starting said pumps, and for disconnecting said cleaner from said bridge and concomitantly stopping said pumps.

5. The combination with a settling tank, a central pier and a bridge supported on the pier and the peripheral wall of the tank and revolving about its support on the pier, of an endless flume adjacent to said peripheral wall and receiving supernatant liquid from the tank, a filter bed in said flume, an overhead filter-bed-cleaner mounted to travel along said flume, said cleaner including a pressure pump and a waste-water-removal pump, and means effective only at a predetermined position of the bridge to connect the cleaner to the bridge for travel therewith and start the pumps and at the end of a subsequent revolution of the bridge to disconnect the cleaner therefrom and concomitantly stop the pumps.

6. The combination with a settling tank, a central pier, a bridge supported on the pier and the peripheral wall of the tank and revolving about its support on the pier, and scraper means carried by said bridge, of an endless flume adjacent to said peripheral wall and receiving supernatant liquid from the tank, a filter bed in said flume, an overhead filter-bed-cleaner, means for connecting said cleaner to said bridge to be drawn thereby along said flume and for disconnecting the cleaner from the bridge, and means for rendering said cleaner effective when attached to the bridge and ineffective when disconnected therefrom.

7. The combination with a settling tank, a central pier and a bridge supported on the pier and the peripheral wall of the tank and revolving about its support on the pier, of an endless flume adjacent to said peripheral wall and receiving supernatant liquid from the tank, a filter bed in said flume, an overhead filter-bed-cleaner, means connecting said cleaner to said bridge to travel therewith and means controlled by the height of water in said flume for raising said cleaner from the filter bed and rendering it ineffective thereon or for lowering said cleaner into effective position with respect to said filter bed.

8. The combination with a settling tank, a central pier and a bridge supported on the pier and the peripheral wall of the tank for revolution about said pier, of an endless flume adjacent to said peripheral wall and receiving supernatant liquid from the tank, a filter in said flume, an overhead filter-bed-cleaner mounted to travel along said flume and including a pressure pump to supply water for washing the filter bed and a suction pump for drawing off waste water, and means for connecting said cleaner to said bridge to travel therewith and said pumps to a source of power on the bridge, said connecting means including members on the cleaner and members carried by the bridge and movable downwardly for connection to said members on the cleaner and upwardly for disconnection from such members.

9. The combination with a settling tank, a central pier and a bridge supported on the pier and the peripheral wall of the tank for revolution about said pier, of an endless flume adjacent to said peripheral wall and receiving supernatant liquid from the tank, a filter in said flume, an overhead filter-bed-cleaner mounted to travel along said flume and including pressure and suction pumps and motors for operating the same, means for connecting said cleaner with said bridge to travel therewith including members on the bridge and members on the cleaner movable with respect to each other into and out of engagement, electrical connections between the pump motors and the connecting members on the cleaner and between the connecting members on the bridge and suitable sources of power.

10. The combination with a settling tank having a peripheral wall, of a launder at the outside of said wall, an endless flume inside the tank and spaced from the peripheral wall to provide a passage for upward flow of supernatant liquid in said tank, a filter bed dividing the flume into upper and lower filter compartments, overflow provisions in said peripheral wall to guard against rise of the liquid above the top of said flume, openings in the outer side wall of the flume to admit liquid from said passage into said flume, a plurality of pipes leading filtered effluent from the lower side of the filter bed to said launder.

11. The combination with a settling tank, and a surrounding launder separated by a wall having provisions for overflow from the tank into the launder, of an endless flume inside the tank and spaced from said wall, the sides of the flume being above the level for overflow from the tank into the launder, a filter bed dividing the flume into upper and lower filter compartments, openings in a side of the flume above the filter bed and below the level of the liquid in the tank, and connections for discharging liquid from the lower filter chamber into said launder.

12. The combination of a settling tank having a peripheral wall and a discharge launder at the outer side thereof and communicating with said tank through a plurality of discharge openings in said peripheral wall, a flume in said tank and spaced from the peripheral wall thereof to provide a passage to permit upward movement therethrough, said flume having overflow weirs at the upper edge of its outer wall and at a higher level than said openings in the peripheral wall of the tank, a filter bed dividing the flume into upper and lower compartments a plurality of pipes extending from the flume beneath the filter bed to the lower part of said launder, and means for passing the liquid through or around the filter bed including means for closing and opening the discharge openings in said peripheral wall and means for closing and opening the passages from the lower part of said flume to the lower part of said launder.

13. The combination of a settling tank having a peripheral wall with an overflow weir, a filter influent trough receiving liquid from said overflow weir and having its opposite wall extending above said weir and provided with a plurality of passages, a filter trough having said opposite wall as one of its side walls and receiving liquid through said openings therein, a filter bed in said trough, a main effluent trough beyond said filter trough, a plurality of pipes to discharge filtered effluent from the lower side of the filter bed to said main effluent trough, a plurality of by-pass pipes extending from the lower part of the filter influent trough to the lower part of said main effluent trough, and gates for said passages and pipes to pass the supernatant liquid through the filter bed or to by-pass the liquid.

PHILIP B. STREANDER.